United States Patent
Friend et al.

(10) Patent No.: US 11,334,455 B2
(45) Date of Patent: May 17, 2022

(54) SYSTEMS AND METHODS FOR REPAIRING A DATA STORE OF A MIRROR NODE

(71) Applicants: Atlassian Pty Ltd., Sydney (AU); Atlassian Inc., San Francisco, CA (US)

(72) Inventors: Richard Friend, Sydney (AU); Bryan Turner, San Francisco, CA (US); Manish Goyal, Sydney (AU)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 19 days.

(21) Appl. No.: 17/025,799

(22) Filed: Sep. 18, 2020

(65) Prior Publication Data
US 2021/0096966 A1     Apr. 1, 2021

Related U.S. Application Data

(60) Provisional application No. 62/907,618, filed on Sep. 28, 2019.

(51) Int. Cl.
*G06F 11/20* (2006.01)

(52) U.S. Cl.
CPC ...... *G06F 11/2082* (2013.01); *G06F 11/2041* (2013.01); *G06F 11/2089* (2013.01); *G06F 11/2097* (2013.01); *G06F 2201/84* (2013.01)

(58) Field of Classification Search
CPC ............. G06F 11/2082; G06F 11/2041; G06F 11/2089; G06F 11/2097; G06F 2201/84
See application file for complete search history.

(56) References Cited

U.S. PATENT DOCUMENTS

| | | | | |
|---|---|---|---|---|
| 5,488,731 A * | 1/1996 | Mendelsohn | ....... | G06F 11/1076 711/114 |
| 5,615,329 A * | 3/1997 | Kern | ................... | G06F 11/2064 714/6.12 |
| 7,793,148 B2 * | 9/2010 | Beardsley | ........... | G06F 11/2082 714/13 |
| 7,908,448 B1 * | 3/2011 | Chatterjee | ........... | G06F 11/2064 711/162 |
| 8,046,548 B1 * | 10/2011 | Chatterjee | ........... | G06F 11/2064 711/162 |
| 8,244,999 B1 * | 8/2012 | Chatterjee | ........... | G06F 11/2064 711/162 |
| 8,595,455 B2 * | 11/2013 | Chatterjee | ........... | G06F 11/2064 711/162 |
| 9,152,642 B2 * | 10/2015 | Harrison | ............. | G06F 11/1464 |
| 11,163,655 B2 * | 11/2021 | Kadayam | ............ | G06F 11/2082 |

(Continued)

OTHER PUBLICATIONS

Cattell, Rick; "Scalable SQL and NoSQL Data Stores"; SIGMOD Rec. 39, 4; Dec. 2010; pp. 12-27 (Year: 2010).*

*Primary Examiner* — Matthew M Kim
*Assistant Examiner* — Indranil Chowdhury
(74) *Attorney, Agent, or Firm* — Brownstein Hyatt Farber Schreck, LLP

(57) ABSTRACT

Described herein is a computer implemented method for repairing data inconsistency between a first mirror node and a primary cluster. The method comprises retrieving a snapshot of the one or more objects from a primary cluster; determining from the snapshot of the objects, one or more operations for the mirror node to perform to ensure data consistency between the mirror node and the primary cluster; and performing the operations.

20 Claims, 8 Drawing Sheets

(56) References Cited

U.S. PATENT DOCUMENTS

| | | | |
|---|---|---|---|
| 2005/0071708 A1* | 3/2005 | Bartfai | G06F 11/2064 714/6.3 |
| 2005/0080891 A1* | 4/2005 | Cauthron | H04L 67/1034 709/223 |
| 2009/0077414 A1* | 3/2009 | Benhase | G06F 11/2071 714/4.11 |
| 2012/0233251 A1* | 9/2012 | Holt | G06F 16/2365 709/204 |
| 2013/0110778 A1* | 5/2013 | Taylor | G06F 11/1435 707/624 |
| 2013/0111262 A1* | 5/2013 | Taylor | G06F 11/2089 714/4.11 |
| 2014/0047263 A1* | 2/2014 | Coatney | G06F 11/20 714/4.11 |
| 2015/0106549 A1* | 4/2015 | Brown | G06F 3/0679 711/103 |
| 2015/0370648 A1* | 12/2015 | Mashima | G06F 11/2041 707/658 |
| 2015/0370662 A1* | 12/2015 | Yoshihashi | G06F 11/2097 714/4.11 |
| 2015/0370663 A1* | 12/2015 | Mizoo | G06F 11/2041 714/4.11 |
| 2016/0357648 A1* | 12/2016 | Keremane | G06F 11/2069 |
| 2018/0074925 A1* | 3/2018 | Kadayam | G06F 11/2082 |
| 2019/0354450 A1* | 11/2019 | Grunwald | H04L 69/40 |
| 2021/0247905 A1* | 8/2021 | Chen | G06F 3/0647 |
| 2021/0303167 A1* | 9/2021 | Thoppil | G06F 3/0644 |

* cited by examiner

SYSTEMS AND METHODS FOR REPAIRING A DATA STORE OF A MIRROR NODE

CROSS-REFERENCE TO RELATED APPLICATION(S)

This application is a nonprovisional patent application of and claims the benefit of U.S. Provisional Patent Application No. 62/907,618, filed Sep. 28, 2019 and titled "System and Method for Repairing Data Inconsistency in a Cluster," the disclosure of which is hereby incorporated herein by reference in its entirety.

FIELD

The present disclosure is directed to systems and methods for mirroring data.

BACKGROUND

In general terms, a mirror is a replica of one or more servers, such as a primary cluster of a source code repository. In certain cases a mirror can act in place of a primary server, for example to respond to certain client requests without the requests having to be handled by the primary server. As a result, a mirror can enable a reduction in network traffic on the primary server, as many user requests can be handled by mirrors rather than the primary server itself. A mirror may also result in wider availability of services and faster access to users.

A mirror may be one of multiple networked mirror nodes. Each of the mirror nodes, which together can be referred to as a cluster or mirror farm, hosts a copy of data or content that is maintained on a primary server and acts together with the other mirror nodes to serve the copy of the content to users. A system architecture with a mirror farm can enable further improvement in access speed for users as the mirror nodes can act to respond to multiple client requests in parallel. A mirror farm may scale in size as the number of clients and requests, and therefore usage of the mirror farm, increases.

Where content maintained by a primary server changes maintaining consistency in data maintained and served by mirror nodes can become difficult. One such example of this is in the context of source code repositories, where the content maintained by the primary server (source code) is frequently changing.

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

SUMMARY

The appended claims may serve as a summary of the invention.

Figure 1:
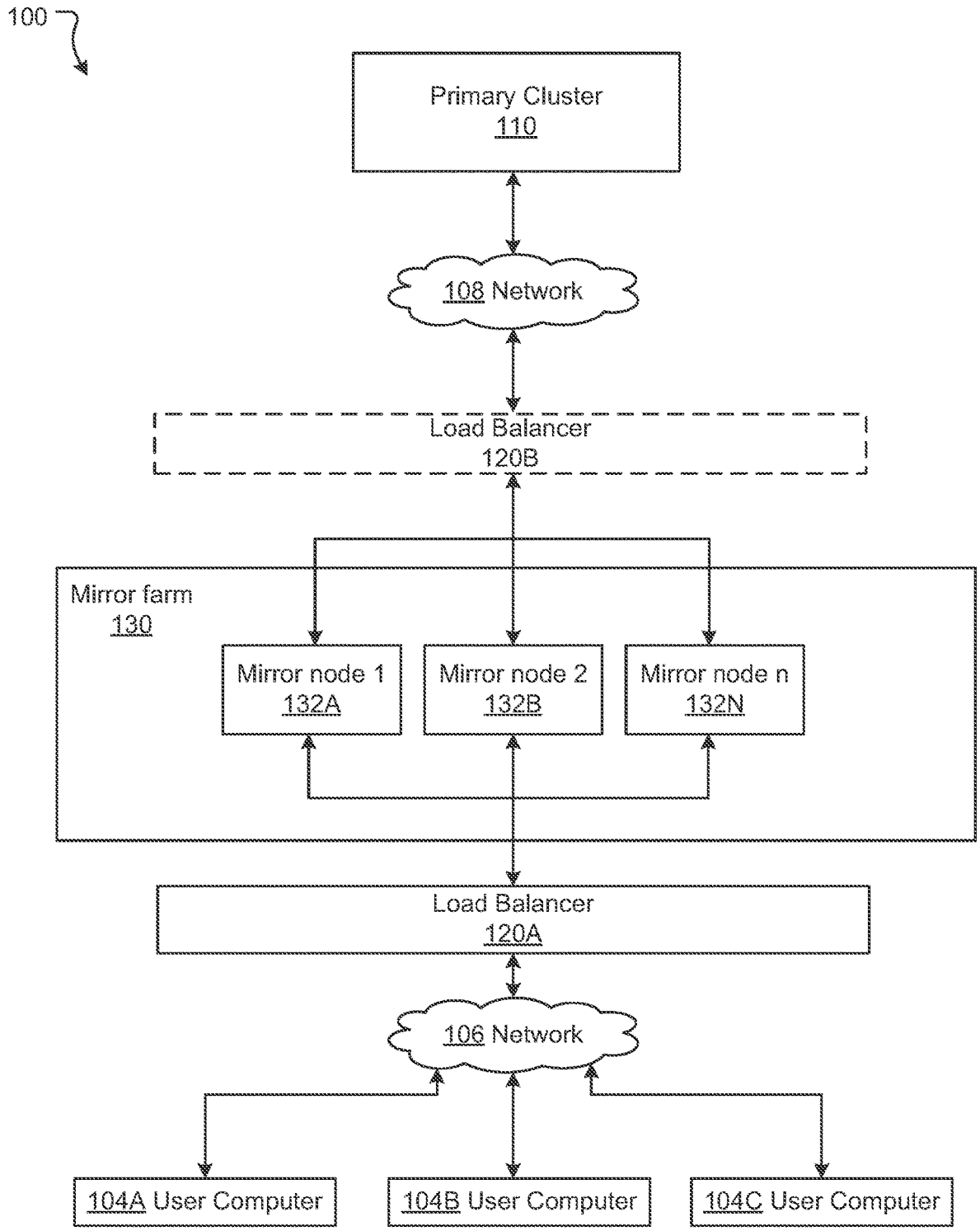
FIG. 1 is a block diagram of a networked environment according to aspects of the present disclosure.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

This disclosure relates to systems and methods for consistent distributed mirroring of a primary cluster. In particular this disclosure relates to maintaining mirror nodes with examples of a source code repository with a load balanced primary cluster. The mirror nodes in a mirror farm operate to serve references to objects (refs) to clients without specific interaction with the source code repository as held by the primary cluster to do so.

In this disclosure, reference is made to primary cluster. The primary cluster could be an originating or primary source of any appropriate type. For example, the primary cluster could be a primary server. Furthermore, while in the described examples the primary cluster (or primary server) is a source code management system server (and, accordingly, the content being served is source code objects) the techniques described herein could be applied to other types of content that are served via one or more mirror nodes.

The replication of data maintained by a primary server, such as a primary cluster, on a mirror node involves synchronising a mirror node's data store with the data store of the primary cluster. In this disclosure, the data of the primary cluster is referred to as the primary content. The data of a mirror node, which is a copy of the primary content created and stored on the mirror node, is referred to as mirrored content. Furthermore, in the present disclosure each mirror node maintains a view (or other representation) of the mirrored content. The view maintained by a mirror node determines the data that is served to a client in response to a client request. In the present disclosure, mirror nodes are configured to update their mirrored content while simultaneously serving a pre-existing view of the mirrored content (that is, the old content prior to the update).

The present disclosure describes multiple mirror nodes which together form a mirror farm, that is, a collection of computer servers where each of the servers is a mirror node that hosts mirrored content of a primary server or cluster's primary content and operates to serve that mirrored content to clients. The set of mirror nodes is grouped together in a way that provides a consistent view of the mirrored content to users. That is, a given mirror node is configured to not modify its view to reference updated mirrored content (i.e. content updated from the primary server or cluster) until all mirror nodes have finished updating their mirrored content.

The primary cluster periodically generates updates when changes to the primary content are made. These updates are communicated to the mirror nodes in order to ensure that the mirror nodes and the primary cluster are synchronized. On receiving an update, a mirror node will determine if the data it has stored is different from the data on the primary cluster. On receiving a given update, a particular mirror node attempts to assume control over the cluster by attempting to lock the cluster. If the lock attempt is successful the particular mirror node exclusively manages synchronising itself (and in some embodiments the other mirror nodes) with the primary cluster based on a snapshot of the data stored on the primary cluster 110 (i.e. a list of objects maintained at the primary cluster 110). The other mirrors nodes can receive the snapshot, or any commands and notifications, in relation to the specific update.

At a high level, the process includes the following steps.

The mirror node determines a local hash of a given object, or an alternative value that can be used to indicate that a change has occurred in that object.

The mirror node retrieves, for example via a stream, a server hash corresponding to the same object from the primary cluster.

The mirror node compares the local hash with the server hash.

If the hashes are different, then the mirror node requests a snapshot (or primary cluster list) of the primary content maintained by the primary cluster.

By comparing the snapshot of the primary content with the local (mirrored) content, the mirror node determines one or more operations that are required to update the mirror node's mirrored content.

The mirror node also shares the snapshot with the other mirror nodes in the mirror farm for the other mirror nodes to determine operations they need to perform to update their mirrored content.

In high volume systems, mirror farms often reside behind a load balancer. This means that there is typically no control over which mirror node receives client requests via the load balancer. Consistency in the context of this disclosure means providing a consistent view of the mirrored content contained within a mirror group to any client no matter which individual mirror they land on.

FIG. 1 illustrates an example system for a consistent mirror farm. In this example, there are three user computers 104A, 104B, 104C. Each of these computers is connected to a network 106. The network 106 could be a suitable network of any kind such as the internet. Also connected to the network 106 is a load balancer 120A. Load balancer 120A operates to distribute network and application traffic across a number of mirror nodes 132 in a mirror farm 130. If multiple users request data that is mirrored on the mirror nodes 132, the load balancer 120A acts to distribute the requests between different mirror nodes 132 rather than having all requests handled by one mirror node 132 and unduly burdening it.

Mirror nodes 132 are, from the perspective of a user, read only. Changes can be made to the mirror nodes 132 but typically only via a specific mechanism that ensures that the mirror nodes are kept synchronised. This means that mirror nodes generally only serve read requests received from user computers. If a user request involves a modification to the primary content, this request is made to and handled by the primary cluster 110 which will, in turn, update the mirror nodes 132 via the appropriate mechanism.

There is optionally a second load balancer 120B between the mirror farm 130 and the primary cluster 110. When a user pushes a change to a repository, the primary cluster 110 will need to update its primary content and notify the mirror nodes of this update. The load balancer 120B operates to distribute such notifications (and other requests) from the primary cluster 110 amongst the mirror nodes 132.

Figure 2:
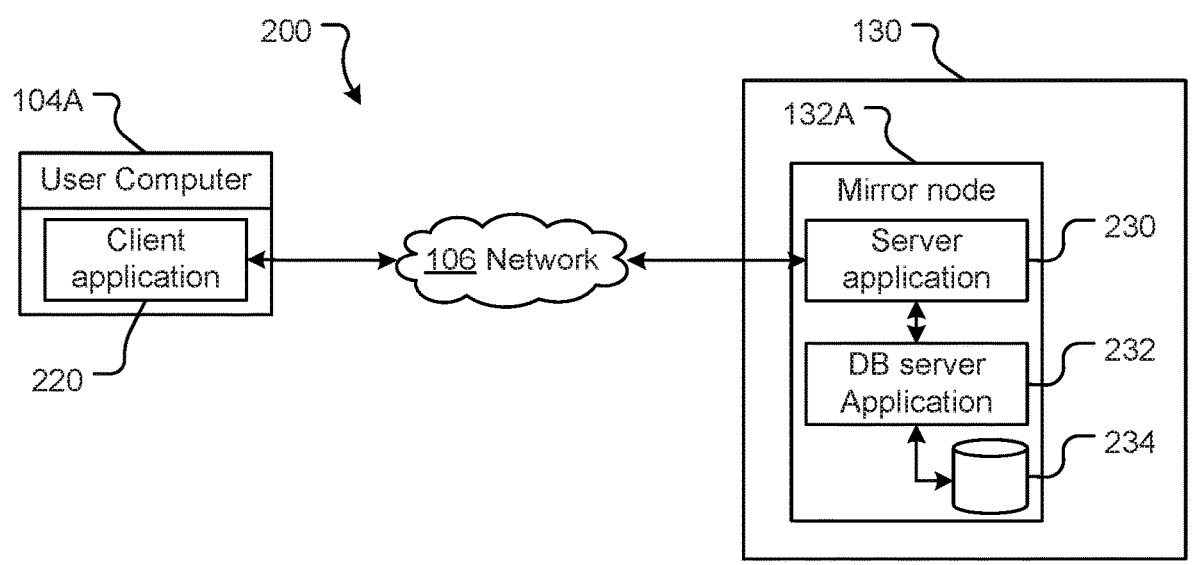
FIG. 2 shows an example user computer and mirror node.

FIG. 2 illustrates an example user computer 104A and a particular mirror node 132A (other mirror nodes such as 132B and 132C being the same or similar). Mirror node 132A is part of a mirror farm 130 (also referred to as a mirror cluster).

Mirror node 132A includes a mirror server application 230, a database server application 232 and a data store 234 that is accessible to the mirror node 132A. The mirror server application 230 configures the mirror node 132A to provide server side mirror functionality—e.g. by receiving and responding to requests from user computers such as 104A, 104B, 104C particularly the client applications on such devices (e.g. client application 220) and retrieving data from the data store 234 as required.

The mirror server application 230 also configures the mirror node 132A to provide server side functionality to coordinate with the primary cluster 110 and other mirror nodes 132B, 132C (not illustrated in FIG. 2) to ensure the data store 234 remains synchronised with the data stores of other mirror nodes 132 in the mirror farm 130. As noted above, the mirror server application 230 operates to serve a particular view or representation of mirrored content to users. Serving a view rather than the mirrored content itself allows mirror nodes 132 to continue to serve content (albeit 'old' content) whilst the mirrored content is being updated in an update process. Only once the update process is complete, and all active mirror nodes have updated their mirrored content, are the mirror node views updated so the updated mirrored content is served. As a result, synchronisation should result in consistency between the data in the data store 234 and the data in the data stores of the other mirror nodes 132B, 132C. It should also result in consistency between the mirror farm and the primary cluster 110. This means that the data store 234 should be updated whenever a user makes a change to the primary cluster's version of the mirrored data, although some lag between an update to the primary content and the mirrored content stored by the mirror node data stores 234 is inevitable.

Mirror node 132A may be a web server (for interacting with web browser clients) or an application server (for interacting with dedicated application clients). While mirror node 132A has been illustrated with a single server application 230, it may provide multiple server applications (e.g. one or more web servers and/or one or more application servers).

Depending on demand from clients (and/or other performance requirements), additional mirror nodes 132 can be provisioned/de-provisioned on demand to increase/decrease the number of servers offered by the mirror farm 130. Each mirror server application 230 may run on a separate computer system and include one or more application programs, libraries, APIs or other software that implement server-side functionality. Similarly, the mirror database server 232 may run on the same computer system as the server application 230, or may run on its own dedicated system (accessible to mirror server application 230 either directly or via a communications network such as network 106, 108).

User computer 104A is a computer processing system with a client application 220 installed thereon. When executed by the user computer 104A (e.g. by a processor thereof) the client application 220 configures the user computer 104A to provide client-side system functionality by communicating (using a communication interface) with the mirror farm 130. As discussed with reference to FIG. 1, in many scenarios a load balancer such as 120A will direct a communication by the client application 220 to one of the mirror nodes 132. A mirror node such as mirror node 132A can respond to a read request from a client application 220 of user computer 104A. The mirror nodes 132 in mirror farm 130 will typically not be configured to respond to a write request received directly from a user computer 104. Instead, requests to change the primary content are made to the primary cluster 110 and propagate through to the mirror nodes 132 in the mirror farm 130 as discussed further below.

The client application 220 may be a dedicated application client that communicates with an application server (such as, in many examples in this disclosure, a source code management server for instance a GIT server) using an API. Alternatively, the client application 220 may be a web browser (such as Chrome, Safari, Internet Explorer, Firefox, or an alternative web browser) which communicates with a web server using http/https protocols.

User computer 104A may be any form of computing device. Typically, user computer 104A will be a personal computing device—e.g. a desktop computer, laptop computer, tablet computer, and in some instances even a mobile phone. While a single user computer 104A has been illustrated, an environment would typically include multiple user computers (such as multiple user computers 104A, 104B, 104C) interacting with the mirror farm 130 and multiple mirror nodes (such as mirror nodes 132B, 132C) handling requests by multiple user computers.

Figure 3:
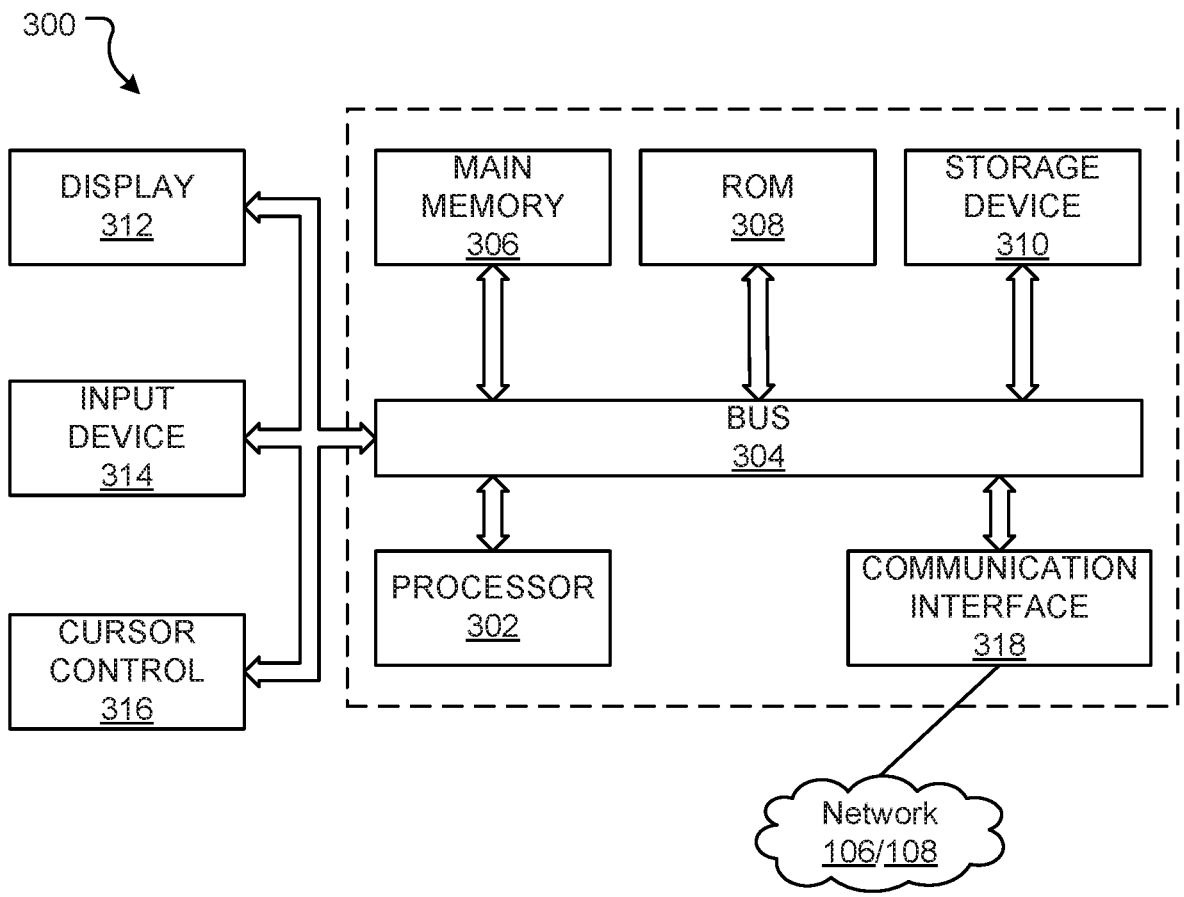
FIG. 3 provides a block diagram of a general-purpose computer processing system configurable to perform various features of the present disclosure.

FIG. 3 provides a block diagram of a general-purpose computer processing system 300. A system such as 300 can be configured to operate (either alone or in conjunction with other computer processing systems) as a primary cluster 110, a mirror node 132, or a user computer 104. It will be appreciated that FIG. 3 does not illustrate all functional or physical components of a computer processing system. For example, no power supply or power supply interface has been depicted, however system 300 will either carry a power supply or be configured for connection to a power supply (or both). It will also be appreciated that the particular type of computer processing system will determine the appropriate hardware and architecture, and alternative computer processing systems suitable for implementing aspects of the invention may have additional, alternative, or fewer components than those depicted, combine two or more components, and/or have a different configuration or arrangement of components.

As noted, computer system 300 may be configured in a plurality of useful arrangements, and while the general architecture of system 300 may be similar (or the same) regardless of arrangements there will be differences. For example, where computer system 300 is configured as a mirror node (such as mirror node 132A), it will typically be provided with higher end hardware allowing it to process data, access memory, and perform network communications more rapidly than, for example, a user computer (such as user computer 104A).

Computer system 300 includes a bus 304 or other communication mechanism for communicating information, and a hardware processor 302 coupled with bus 304 for processing information. Hardware processor 302 may be, for example, a general purpose microprocessor, a graphical processing unit, or other processing unit. The processing unit 302 may be a single computer-processing device (e.g. a central processing unit, graphics processing unit, or other computational device), or may include a plurality of computer processing devices. In some instances all processing will be performed by processing unit 302, however in other instances processing may also, or alternatively, be performed by remote processing devices accessible and useable (either in a shared or dedicated manner) by the system 300.

Computer system 300 also includes a main memory 306, such as a random access memory (RAM) or other dynamic storage device, coupled to bus 304 for storing information and instructions to be executed by processor 302. Main memory 306 also may be used for storing temporary variables or other intermediate information during execution of instructions to be executed by processor 302. Such instructions, when stored in non-transitory storage media accessible to processor 302, render computer system 300 into a special-purpose machine that is customized to perform the operations specified in the instructions.

Computer system 300 further includes a read only memory (ROM) 308 or other static storage device coupled to bus 304 for storing static information and instructions for processor 302.

A storage device 310 is provided also and coupled to bus 304 for storing information and instructions. Storage device 310 is a non-transitory media capable of storing data and/or instructions. Example storage devices media include floppy disks, hard disks, solid state drives, magnetic tape devices (or any other magnetic data storage medium), a CD-ROM (or any other optical data storage medium), and other any physical medium.

Computer system 300 also includes a communication interface 318 coupled to bus 304. System 300 may connect to a communications network such as network 106 and/or 108 (which may be for e.g. the Internet, a local area network, a wide area network, a personal hotspot etc.) to communicate data to and receive data from networked devices, which may themselves be other computer processing systems.

Communication interface 318 provides a two-way data communication coupling to a communication network, for example communication network 102 of environment 100. For example, communication interface 318 may be an integrated services digital network (ISDN) card, cable modem, satellite modem, etc. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Computer system 300 can send messages and receive data, including program code, through the network(s) 106, 108 and communication interface 318.

Where computer system 300 is a user computer 104, the computer system 200 may be coupled via bus 304 to a display 312 (such as an LCD, LED, touch screen display or other display), for displaying information to a computer user. System 300 may also include or connect to devices which may act as both input and output devices, for example memory devices such as storage device 310 (e.g. hard drives, solid state drives, disk drives, compact flash cards, SD cards and the like) which system 300 can read data from and/or write data to, and touch-screen displays which can both display (output) data and receive touch signals (input). An input device 314, including alphanumeric and other keys, may be coupled to the bus 304 for communicating information and command selections to processor 302. Another type of user input device is cursor control 316, such as a mouse, a trackball, or cursor direction keys for communicating direction information and command selections to processor 302 and for controlling cursor movement on display 312.

According to one embodiment, the techniques herein are performed by computer system 300 in response to processor 302 executing one or more sequences of one or more instructions contained in main memory 306. Such instructions may be read into main memory 306 from another storage medium, such as storage device 310, a remote database, or an alternative computer readable storage device. Execution of the sequences of instructions contained in main memory 306 causes processor 302 to perform the process steps described herein. In alternative embodiments, hard-wired circuitry may be used in place of or in combination with software instructions.

Wired connection with other devices/networks may be by any appropriate standard or proprietary hardware and connectivity protocols. For example, system 300 may be configured for wired connection with other devices/communications networks by one or more of: USB; FireWire; eSATA; Thunderbolt; Ethernet; OS/2; Parallel; Serial; HDMI; DVI; VGA; SCSI; AudioPort. Other wired connections are, of course, possible.

Wireless connection with other devices/networks may similarly be by any appropriate standard or proprietary hardware and communications protocols. For example, system 300 may be configured for wireless connection with other devices/communications networks using one or more of: infrared; Bluetooth; Wi-Fi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are, of course, possible.

System 300 may be any suitable computer processing system such as, by way of non-limiting example, a desktop computer, a laptop computer, a netbook computer, tablet computer, a smart phone, a Personal Digital Assistant (PDA), a cellular telephone, a web appliance. Typically, system 300 will use the communications interface 318 for communication with a network 108 or network 106. In these examples, the network 106 and network 108 may be the same even though they are illustrated as different networks. The number and specific types of devices which system 300 includes or connects to will depend on the particular type of system 300. For example, if system 300 is a desktop computer it will typically connect to physically separate devices such as (at least) a keyboard, a pointing device (e.g. mouse), a display device (e.g. a LCD display). Alternatively, if system 300 is a laptop computer it will typically include (in a physically integrated manner) a keyboard, pointing device, a display device, and an audio output device. Further alternatively, the system could be a virtual machine or other emulation of a computer system.

In some embodiments, mirror nodes 132 in a mirror farm 130 may take control of ref advertisement. This may allow the mirror farm to only advertise objects that have been synchronised to all mirror nodes for the purpose of consistency.

Figure 4:
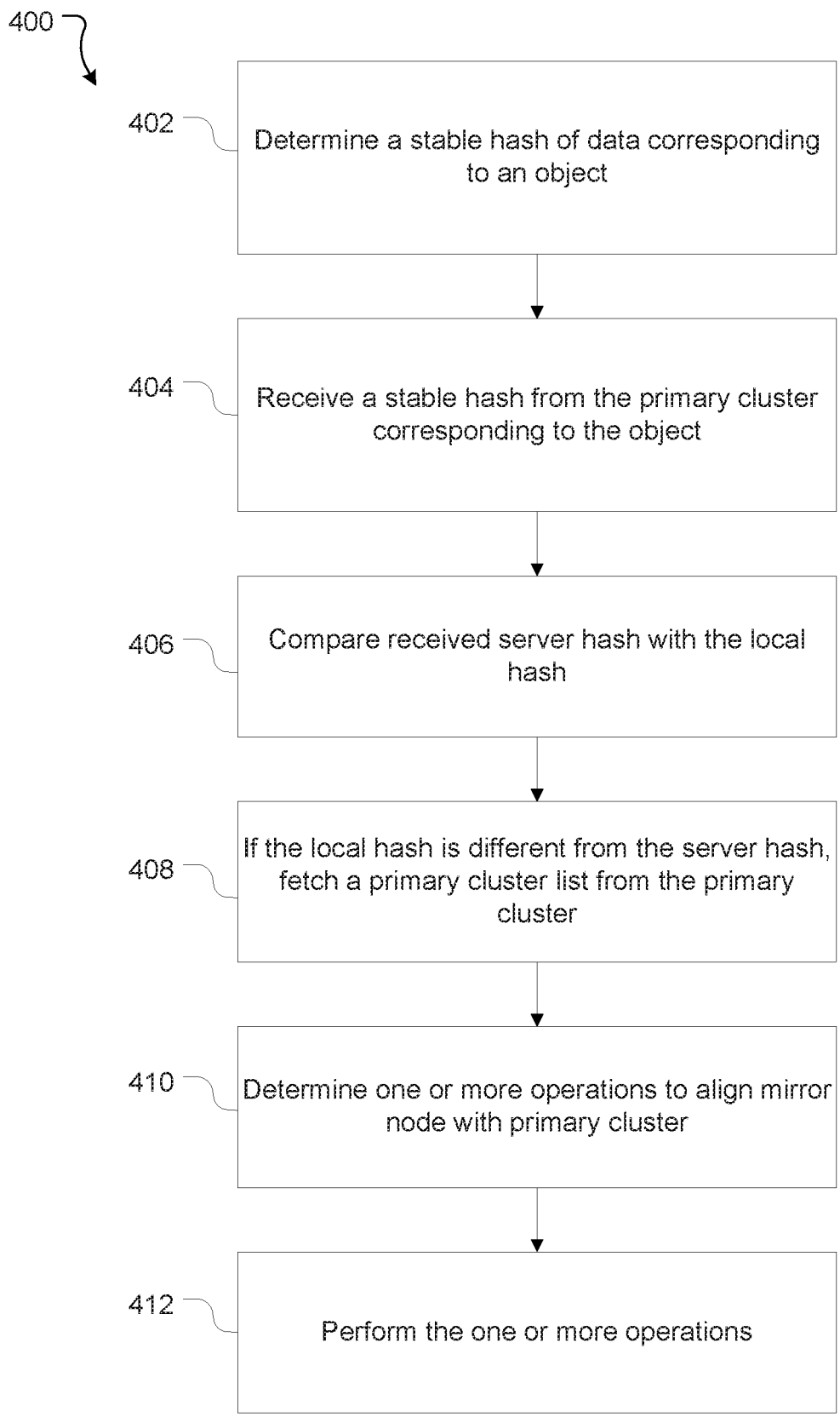
FIG. 4 is a flowchart of a process for repairing data inconsistency between a mirror node and primary cluster.

FIG. 4 illustrates an overview of an example process 400 for updating a mirror node to ensure consistency between the mirror nodes 132 in a mirror cluster 130. Process 400 is performed by a particular mirror node 132 (e.g. node 132A) of multiple mirror nodes.

At 402, mirror node 132A determines a stable hash of data corresponding to an object maintained by the mirror node (referred to in this description as a local hash). Stable in this context means that the same input to a hash function results in the same output (that is, the hash) regardless of when or how it is computed. Operation 402 may be triggered by the mirror node 132A determining that a change has been made to the object in question at the primary cluster 110 or being notified by the primary cluster 110 that an update or change to that object has occurred. In some cases the mirror node 132A may determine that it has already computed the local hash (and the local version of the object has not changed since doing so) and therefore does not need to recompute the hash.

At 404, the mirror node receives a stable hash in respect of the corresponding object maintained at the primary cluster 110 (referred to in this description as the server hash). The sever hash and local hash are calculated using the same hash function. Accordingly, if the primary cluster version of the object (on which the server hash is calculated) is the same as the local version of the object (on which the local hash is calculated) the server and local hash values will be the same.

Operations 402 and 404 may be performed in any order. For example, in some embodiments, the server hash can be received prior to the mirror node 132A receiving changed data in respect of the object in question.

At 406, the mirror node 132A compares the server hash with the local hash of the object.

In certain embodiments, mirror node 132A receives a stream of server hashes from the primary cluster 110. In this case, mirror node 132A performs the comparison at 406 for each sever hash received in the stream. In some embodiments, not all objects will require a hash—e.g. if an object has not changed at the primary cluster. In this case a hash message corresponding to an object that has not changed at the primary cluster will not be included/received in the stream.

At 408, the mirror node 132A fetches a primary cluster list (also referred to as a snapshot) from the primary cluster 110. The primary cluster list is a listing of primary cluster objects: i.e. objects maintained by the primary cluster 110. This occurs if the mirror node's local hash of an object is different from the corresponding server hash of the object, for example as received in the stream, which indicates that there is a discrepancy between the mirrored content (i.e. local objects stored at the mirror node 132A) and the primary content (i.e. primary cluster objects stored at the primary cluster). This may occur, for example, when a change in data has not been successfully communicated to the mirror node 132A from the primary cluster 110. The primary cluster list typically contains a sequence of labels identifying primary cluster objects and corresponding hashes of the represented primary cluster objects.

A label is a name or other identifier of an object. A label may also indicate a version of the object. Labels in most commonly used repositories such as GIT are ordered and increase in a monotonic increasing order. Typically, the label for an object is incremented in order for each version of the object or on creating a new object. For example, the first object is 'A', and the next object is 'B.' Similarly, a new version of the object 'A' may be 'C' and so on.

Once the primary cluster list is received, at 410 the mirror node 132A determines one or more operations that are required to bring the mirror node 132A into line with the primary cluster 110. That is, a mirror node 132A can determine what operations are required to remedy any discrepancies in the mirrored content maintained by the mirror node 132A when compared to the primary content maintained by the primary cluster 110. Examples of operations include add, delete, and update operations. In some embodiments, 'ignore' or 'no change' may be considered an operation as well.

At 412, mirror node 132A performs the operations determined at 410. Following this, mirror node 132A should have the same data as the primary cluster 110.

Figure 5:
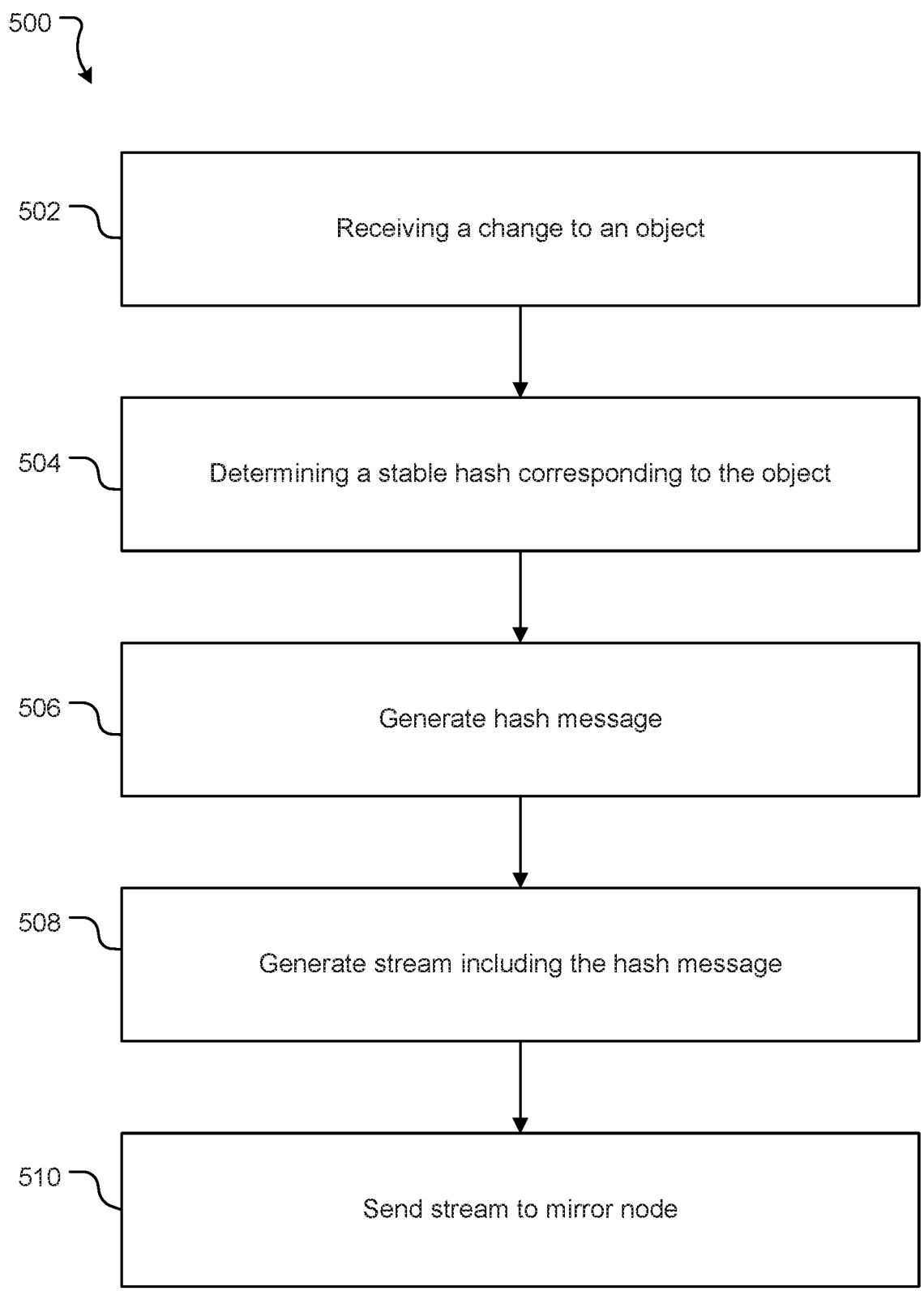
FIG. 5 is an example flowchart of a process for streaming hashes relating an object.

In the present embodiments, server hashes are received from the primary cluster 110 via a stream. FIG. 5 illustrates an example process 500 for generating such a stream. In this example, the stream is a stream of one or more hash messages. Each of the one or more hash messages corresponds to an object.

At 502, primary cluster 110 receives a change to an object. In the example where primary cluster 110 is a source code repository, such a change generally comes from a user making a change to source code.

At 504, the primary cluster 110 determines a stable hash that corresponds to the object that has been changed. This generally involves providing the object as input to a hash function.

At 506, the primary cluster 110 generates a hash message. The hash message includes the hash that corresponds to the object generated at step 504. The hash message may also include a label of the object in question.

At 508, the primary cluster 110 generates a stream including the hash message. The stream may contain one or more hash messages that correspond to one or more objects. Typically, the hash messages correspond to one or more objects that have been identified as having changed.

At 510, the primary cluster 110 sends the stream to a mirror node 132. This may occur while the data that is to be streamed is still being generated. That is, the primary cluster 110 may send a part of the stream (for example, a first hash message) to the mirror node 132 while at the same time generating a new part of the stream (for example, a second hash message).

Figure 6:
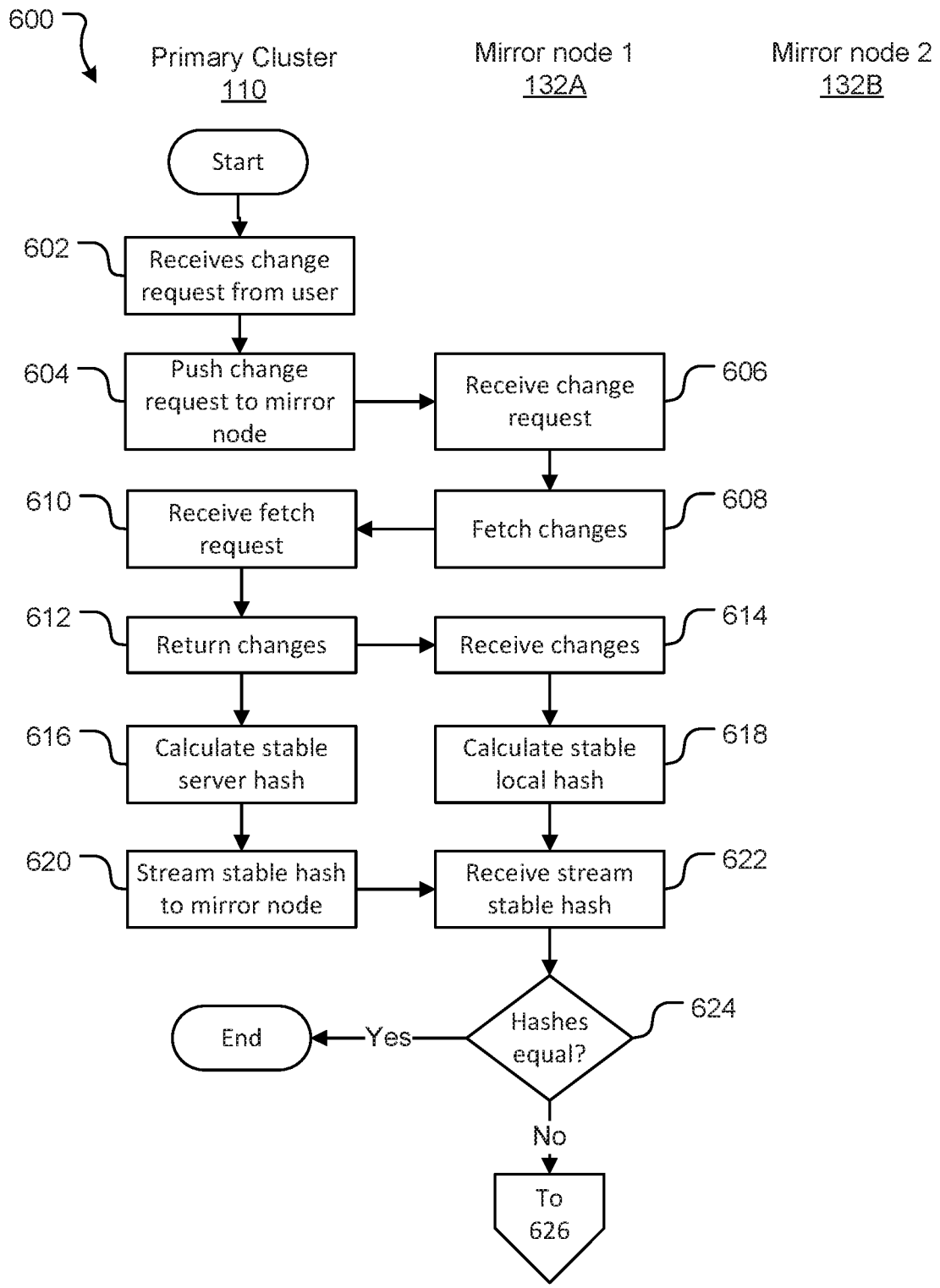
FIGS. 6 and 7 provide a flowchart of an example detailed process corresponding to the process of FIG. 4.
Figure 7:
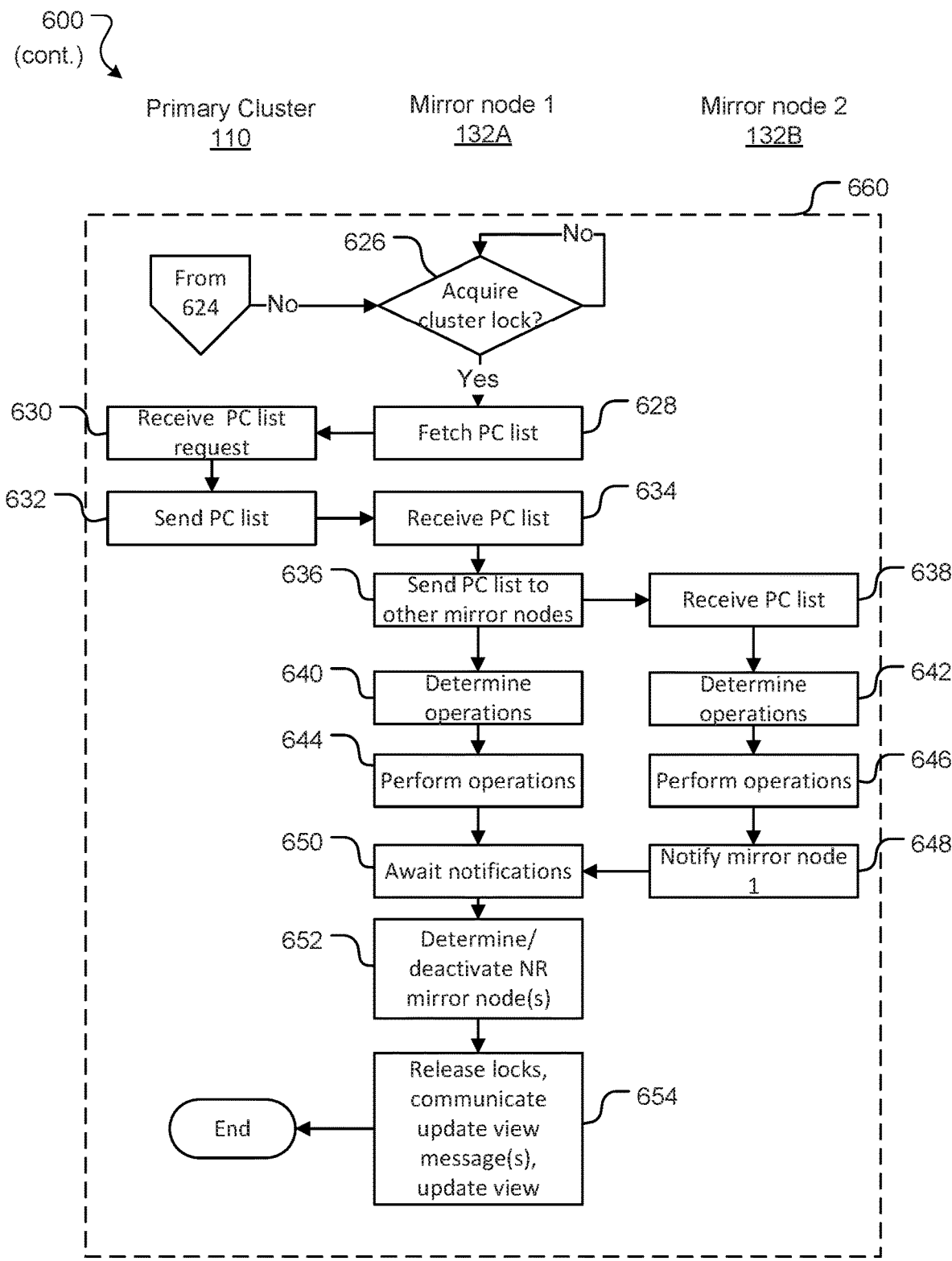

FIG. 6 illustrates a more detailed illustration of a process 600 for updating a mirror node 132A to ensure consistency between mirror nodes 132 in a mirror farm 130.

In this example, there are three components: primary cluster 110, mirror 132A and mirror 132B. In practice there are likely to be multiple mirror nodes (e.g. 30 or more depending on load requirements) and the processes described in this disclosure could apply to any number of mirror nodes. This example is limited to two mirror nodes for illustrative purposes.

In this example, the primary cluster 110 is a version control source code repository (of which GIT is an example). Mirror nodes 132A and 132B serve read only copies (i.e. mirrored content) of code that the primary cluster 110 maintains (i.e. the primary content).

In this source code example, the primary cluster 110 maintains a collection of commits to the source code. There are objects and refs, where each object relates to a commit in the source code and the refs are pointers into commit objects. In this example, there is a key-value data store where entering content into a repository provides a unique key which can be later used to retrieve that content. The refs are either the unique keys themselves or data that can be used to acquire or determine the keys (such as where a ref is a file that contains the unique key to an object). Typically, a unique key is a hash generated by a hash function such as SHA-1.

At 602, the primary cluster 110 receives a change request from a user computer 104 (or, more particularly, a client application 220 running on a user computer 104).

When the primary cluster 110 receives this change, the primary cluster 110 may generate a change notification. The change notification may depend on the type of data that the primary cluster 110 is serving. Process 600 may work with (or be adapted to work with) many different types of source code repositories. For example, the primary cluster 110 may be an upstream bitbucket server. In this case, the upstream bitbucket server can generate a change notification that includes objects as well as references to objects that have changed. In this case, a change notification with only references to the objects is needed. Alternatively, the primary cluster 110 may be a GIT server, in which case the primary cluster 110 may generate a ref-file using either a git uploadpack—advertise-refs operation or a resurrected java based ref advertisement. In this example, a ref change event may be created with the digest of the just generated ref-file as well as the previous ref-file digest and also a set of RefChanges that have been applied to the repository by a user's pushed changes.

At 604, the primary cluster 110 communicates the change request to the mirror node such as in this example mirror node 132A. In some embodiments, the change request may be allocated to a mirror by a load balancer.

At 606, a mirror node 132A receives the change request communicated by the primary cluster 110.

At 608, the mirror node 132A, having received the change request, fetches from the primary cluster 110 the relevant changes. In some embodiments, the mirror node 132A may first identify whether it has the relevant data already, in which case the mirror node 132A may not fetch changes.

At 610, primary cluster 110 receives the fetch request. In some embodiments, the primary cluster 110 will determine any changes that need to be sent to the mirror node 132A. In some embodiments, the primary cluster 110 may determine that only the changes will need to be sent. In other embodiments, the primary cluster 110 may determine that data or objects including the changes may be sent. For example, it may be more efficient to simply just send a file that has changed, rather than sending lines within the files that have changed, particularly where there are multiple changes to the same file.

At 612 the primary cluster 110 returns the changes to the mirror node 132A.

At 614, the mirror node 132A receives the changes from the primary cluster 110. In a normal case, if these changes are received, the stable hashes compared at 624 should be the same. In some cases, however, the changes are not received by the mirror node 132A, for example due to a fault in the network. This may be one reason why the stable hashes of the object in question may be different.

In the example of FIG. 6, mirror node 132A receives the changes while the primary cluster 612 continues with the process in parallel.

In this example primary cluster 110 and mirror node 132A each calculate a stable hash. At 616, the primary cluster 110 calculates a stable hash on the data that it has stored for each object (the server hash). Similarly, at 618 the mirror node 132A calculates a stable hash on the data it has stored for each object (the local hash). If the mirror node 132A has received the changes at 614, then the changes are applied to the data object prior to calculating the local hash at 618. In some embodiments, the primary cluster 110 may calculate the stable hash earlier in the process, and can be calculated at any point once the data has been changed by the user.

At 620, the primary cluster streams the stable hash calculated at 616 to the mirror node 132A. This may be an ongoing process of streaming where the stream includes multiple hashes corresponding to multiple objects. For illustrative purposes, the example in FIG. 6 illustrates a stream that includes one hash corresponding to one object.

At 622, the mirror node 132A receives the server hash from the primary cluster 110.

At step 624, the mirror node 132A compares the local hash calculated by the mirror node 132A itself with the server hash received from the primary cluster 110. If the hashes are equal, the two corresponding objects are determined to be the same (ignoring the possibility of a hash collision which can be exceedingly rare depending on the hash technique used). At this point, process 600 can end as the objects are the same.

If the hashes are different, then the process proceeds to step 626. This step and remaining steps in the process relate to an update process 660 for updating the data that the mirror nodes have stored in relation to the corresponding object that has been changed or otherwise identified as having a discrepancy between the mirror node and the primary cluster.

At 626, the mirror node 132A attempts to acquire a lock across the mirror nodes 132 in the mirror farm 130 (in this particular example 132A and 132B) to ensure that no other mirror nodes 132 are performing an update process or that no other mirror nodes are performing an update process on the same data (that is, the same objects in the source code repository example). In some embodiments, mirror node 132A may only try to acquire a lock on a subset of the data that the mirror is maintaining. For example, if the change relates to a branch of source code, then a lock may be acquired only in relation to that branch or the objects that relate to that branch. This allows other branches of that source code to be updated in parallel, and further update processes to be performed if a change notification in respect of those other branches is received while the current update process is being performed.

In this example, if the lock acquisition is not successful, the mirror node 132A may wait a specified period of time (e.g. 100 ms or an alternative time period) before returning to 626 to try again to acquire the lock. In some embodiments, if the mirror node 132A is not successful in acquiring the lock, the mirror node 132A may simply try again until it succeeds. In other embodiments, if the lock cannot be obtained within a predetermined number of attempts the process terminates.

If the lock acquisition is determined to be successful at 626, processing proceeds to 628. At 628 mirror node 132A fetches a primary cluster list from the primary cluster 110. As noted above, the primary cluster list typically includes a list of objects maintained by the primary cluster 110 (i.e. primary cluster objects), and for each object includes an object label and server hash value. The server hash, as discussed above, provides a mechanism for determining whether the data associated with the object at the primary cluster 110 is the same as the data associated with the object at the mirror node 132A.

At 630, the primary cluster 110 receives the fetch request.

At 632, in response to the fetch request the primary cluster 110 sends the requested primary cluster list to mirror node 132A.

At 634, mirror node 132A receives the primary cluster list from the primary cluster 110.

At 636, following receipt of the primary cluster list, mirror node 132A sends the primary cluster list to the other mirror nodes 132 of the mirror farm 130 (which in this example is mirror node 132B). In alternative embodiments, the primary cluster 110 will send the primary cluster list to all mirror nodes 132 in the mirror farm 130 directly, rather than via the mirror node 132A.

At 638, the other mirror nodes 132 in the mirror farm 130 receive the primary cluster list. In this particular example, mirror node 132B receives the primary cluster list.

At 640, mirror node 132A determines operations needed to bring the mirror node's data into line with that data as stored by the primary cluster 110. Examples of operations include add, delete, and update. The operations will be described in more detail below.

Similarly, at 642 mirror node 132B determines operations to bring its data into line with that data as stored by the primary cluster 110 (and, therefore, into line with other mirror nodes 132 that are also being updated—e.g. mirror node 132A).

In some embodiments, a single mirror node 132 (e.g. 132A) may perform a computation to determine operations to bring that mirror node 132 into line with the primary cluster 110 and then share these operations with the other mirror nodes 132 of the mirror farm 130. This may assist with reducing network traffic and any lag in update between the primary cluster 110 and the mirror nodes. However, this generally requires that all mirror nodes in the mirror farm 130 have the same data and therefore will need to perform the same operations. There may be situations where this is not the case, such as a partial or failed update process, and therefore in such cases the mirror nodes may need to individually determine operations to bring themselves into line with the primary cluster 110.

In the present embodiment, at 644, mirror node 132A performs the operations determined at 640 and at 646, mirror node 132B performs the operations determined at step 642. In other embodiments, certain operations (e.g. delete and update) may not be performed until views have been updated. This allows a mirror node 132 to continue serve existing content until its view is updated.

At 648, once mirror node 132B has completed performing the operations, mirror node 132B generates and communicates an update complete notification the mirror node 132A. The update complete notification indicates to mirror node 132A that mirror node 132B has performed the update operations and, accordingly, mirror node 132A is aligned with the primary cluster 110 (and any other mirror nodes 132 that have communicated update compete notifications to mirror node 132A).

At 650, mirror node 132A waits for update complete notifications from other mirror nodes 132 in the mirror farm 130. In the present example, mirror node 132A only has to wait for a notification from the single other mirror node 132B. However it is to be noted that this is simplified for illustrative purposes. In practice there are likely to be multiple mirror nodes 132. As the number of mirror nodes 132 in the mirror farm 130 increases, so too does the likelihood that one or more mirror nodes 412 may fail to complete an update.

Mirror node 132A may be configured to wait for update complete notifications from other mirror nodes 132 for a threshold timeout period. In some embodiments, if an update complete notification is not received from a particular mirror node 132 within the timeout period, mirror node 132A may retry the update process for that particular mirror node 132 by re-sending the primary cluster list to that mirror node 132 (e.g. per 636).

In the present embodiment, at 652 mirror node 132A determines if there are any non-responsive mirror nodes 132 in the mirror farm 130 and, if so, performs operations to cause such non-responsive mirror nodes to be deactivated.

Mirror node 132A determines a particular mirror node 132 to be non-responsive if mirror node 132A does not receive an update complete notification from that mirror node 132 within the threshold timeout period (or, where retries are performed, within the threshold timeout period of the last retry).

Deactivation of a non-responsive mirror node may be performed in any appropriate way. For example, mirror node 132A may generate and communicating a deactivation message to the mirror node 132 in question and/or generate and communicate a deactivation message indicating the non-responsive mirror node to the primary cluster 110 (the primary cluster 110 then responsible for deactivating the non-responsive mirror node). Deactivation of a given mirror node 132 may involve the given mirror node being removed from the mirror farm 132, the given mirror node 132 shutting down (and, optionally, a new mirror node being started in its place), or causing the given mirror node to not receive (or respond) to client requests. In some cases, particularly where there is limited capacity in mirror farm 130, mirror node 132A may notify an administrator for approval to deactivate one or more nodes prior to proceeding.

Once all mirror nodes 132 in the mirror farm 130 have either responded or been flagged as non-responsive, processing proceed to 654. At 654, update complete notifications have been received from all active mirror nodes 132 in the mirror farm 130 (i.e. all mirror nodes that have not been flagged as non-responsive). In this case, mirror node 132A releases the locks that were acquired on the active mirror nodes at 626. The lock obtained at 626 acts to ensure that any requests for an update to the same data while the update process 660 is being performed will be rejected or delayed.

In some embodiments, at 654 mirror node 132A explicitly communicate an update view message to the other active mirror nodes 132. The update view message indicates that the update process has been completed, and therefore that the active mirror nodes 132 can update their view to reference the now updated content (i.e. the content after performing operations at 644/646). In other embodiments, when mirror node 132A releases the lock on another mirror node this indicates to other mirror node 132 that its view can be updated.

At 654, mirror node 132A also updates its own view (so that it too references the now updated content).

With all active mirror node views updated, a user requesting content from the mirror nodes will be served the updated content no matter which specific mirror node 132 receives the user request. Prior to a mirror node's view being updated, a mirror node 132 can still serve content, but until all mirror nodes 132 have been successfully updated (or timed out and removed from the mirror farm 130) the mirror nodes 132 serve the pre-updated version of the content in question rather than updated content. In many use cases doing this—i.e. uniformly serving non-updated content —is preferable to having some mirror nodes 132 serve updated content and some serve old content.

If mirror node 132A fails, a recovery processes may be initiated to ensure that the mirror nodes 132 in the mirror farm 130 remain synchronised with each other and with the primary cluster 110. In some embodiments there may be a full system synchronisation at scheduled intervals so a mirror node 132 may only be out of synchronisation for a short period of time.

Figure 8:
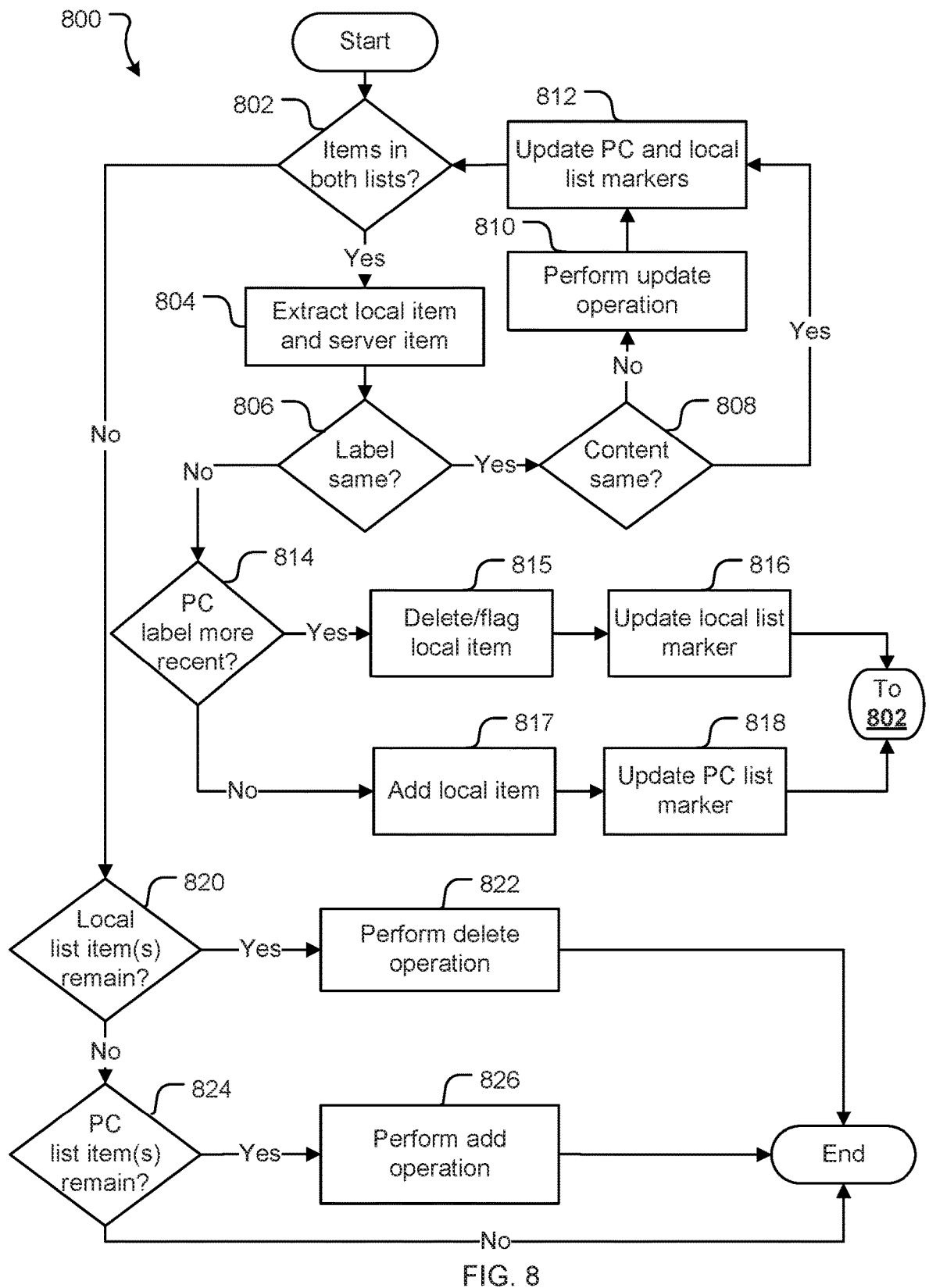
FIG. 8 is a flowchart of an example detailed process of determining operations to bring the mirror node into line with the primary cluster.

Turning to FIG. 8, a process for determining operations required by a mirror node 132 to align its content with that stored by the primary cluster 110 will be described.

At a high level, determining operations to bring a mirror node 132 into line with the primary cluster 110 involves taking items in a local list of objects that the mirror node 132 (e.g. mirror node 132A) maintains (i.e. local objects) and comparing the local with a list of objects the primary cluster 110 maintains (e.g. a primary cluster list as received at 634 above).

The local list of local objects may be maintained by a mirror node 132 as it adds/updates/removes objects, or may generated by a mirror node 132 on an as needs basis.

Generally speaking, there are four potential scenarios that arise when comparing the objects locally stored by a mirror node 132 with the objects stored by the primary cluster 110.

If a particular primary cluster object referenced in the primary cluster list does not have a corresponding local object referenced in the local list, the primary cluster object needs to be added as (or flagged for addition as) a new local object at the mirror node 132. This involves fetching the primary cluster object in question from the primary cluster 110 and storing it as a local object in the mirror node's data store 234.

If a particular local object referenced in the local list does not have a corresponding primary cluster object referenced in the primary cluster list, that local object needs to be deleted from (or flagged for deletion from) the mirror node 132. This involves deleting the local object from the mirror node's data store or otherwise flagging the local object as one that is not to be served.

If a particular local object referenced in the local list has a corresponding primary cluster object referenced in the primary cluster list, a further check needs to be performed to determine whether those objects are the same or different. If the objects are the same, no update is necessary with respect to the object. If the objects are different, an update operation needs to be performed to update the object referenced in the local list to align it with the corresponding object referenced in the primary cluster list. Updating an object may involve retrieving data allowing the local version of the object (as stored at data store 234) to be updated. Alternatively, updating an object may involve deleting the local object stored at the mirror node's data store 234 (or otherwise flagging that object as one that is not to be served), retrieving the relevant primary cluster object from the primary cluster 110, and adding the primary cluster object as a new local object.

FIG. 8 is a more detailed illustration of a process 800 for determining operations performed by a mirror node 132 to bring that mirror node 132 into line with the primary cluster.

Process 800 can, for example, be performed at operations 640 and 644 (or 642 and 646) of process 600 described above. In this example, process 800 is described as being performed by mirror node 132A, but a similar process may be performed by any mirror node 132 in the mirror farm 130.

Initially, mirror node 132A begins with a primary cluster list (e.g. as received from the primary cluster at 634 above) and a local list (generated by mirror node 132A based on locally stored objects). Each item in the primary cluster list represents an object maintained by the server (i.e. the primary cluster 110 in the present embodiments) and includes a label for the object and a hash of the object (the server hash). Similarly, each item in the local list represents an object maintained by the mirror node 132A and includes a label for the object and a hash of the object (the local hash). The server and local lists are both ordered in the same way—in the present example according to label.

Generally speaking, process 800 involves iteratively comparing each item in the primary cluster list with the corresponding item in the local list. To do so, mirror node 132A maintains markers of the current items being processed in each list: i.e. a local list marker pointing to a local list item and a primary cluster list marker pointing to a primary cluster list item. As items in the local and primary cluster lists are processed the markers are updated.

At 802, mirror node 132A determines whether there are unprocessed items still left to compare in both lists. In some processing loops, one list (either the server or local list) may have unprocessed items while the other list does not, in which case an add or delete operation may be required.

At 804, the mirror node 132A extracts a local item (i.e. the local list item indicated by the local list marker) and a server item (i.e. the primary cluster list item indicated by the primary cluster list marker).

At 806, the mirror node 132A compares the labels of the two items. If, at 806, the labels are the same, at 808 the mirror node 132A compares the content of the items (that is, the server hash value from the primary cluster list item and the local has value from the local list item). If, at 808, the content is not the same, then the mirror node 132A determines an update operation for the object is required. In this case mirror node 132A performs the update operation (or flags an update operation to be performed) at 810 before processing continues to 812. In order to actually update an object, mirror node 132A may need to fetch data in respect of the object from the primary cluster 110.

If, at 808, mirror node 132A determines that the content is the same, no update operation is required as the objects are already the same and processing continues directly to 812.

At 812, mirror node 132A moves the primary cluster list marker and local list marker forward to indicate that the next item in the primary cluster list and local list respectively. Following 812, processing returns to 802.

If, at 806, the labels are not the same, processing continues to step 814. At 814, mirror node 132A determines which of the labels is more recent. Typically, labels are incremented consecutively with each change made at the source code repository (e.g. the primary cluster 110). This means that a label 'B' (for example) would be more recent than a label 'A'.

If, at 814, the mirror node 132A determines that the label of the primary cluster list item is more recent, this means the local item corresponds to an object that is not in the primary cluster list (and, therefore, an object that is no longer maintained by the server/primary cluster 110). Accordingly, at 815 the mirror node 132A flags the object referenced by the local list item for deletion. In the present embodiment, actual deletion of the object in question does not occur until after the mirror node 132A has updated its view (e.g. at 654). This allows the mirror node 132A to continue to serve the object until the view is updated. Following this, at 816 mirror node 132A updates the local list marker to point to the next item in the local list before returning to 802.

If, at 814, the mirror node 132A determines that the label of the local list item is more recent, this means a new object needs to be added at the mirror node 132A. Accordingly, at 817 the mirror node 132A adds the object referenced by the primary cluster list item. In order to add an object, mirror node 132A may need to fetch the relevant data from the primary cluster 110. Following this, at 818 mirror node 132A updates the sever list marker to point to the next item in the primary cluster list before returning to 802.

Returning to 802, if all items in one or both of the local and primary cluster lists have been processed processing proceeds to 820. At 820, the mirror node 132A determines if there are unprocessed items in the local list. If so, this indicates that one or more objects currently maintained by the mirror node 132A have been deleted at the primary cluster 110. Accordingly, at 822 mirror node 132A performs one or more delete operations (or flags one or more delete operations to be performed) to delete such objects—i.e. to delete objects referenced by the remaining items in the local list. Process 800 is then complete.

If, at 820, the mirror node 132A determines if there are no unprocessed items in the local list processing continues to 824. At 824, mirror node 132A determines if there are unprocessed items in the primary cluster list. If so, this indicates that there have been objects added to the primary cluster 110 which have not been communicated to the mirror node 132A. Accordingly, at 826 mirror node 132A performs one or more add operations to add such objects—i.e. to add objects referenced by the remaining items in the primary cluster list. As noted above, in order to add an object, mirror node 132A may need to fetch the relevant data from the primary cluster 110. Process 800 is then complete.

After either the delete operation or the add operation has been performed, the process ends.

The following table represents an example with a local list and a primary cluster list (the 'item no' column being for ease of reference).

| Item No. | Local list | Primary cluster list |
| --- | --- | --- |
| 1 | [Label: A, Hash: 1] | [Label: A, Hash: 1] |
| 2 | [Label: B, Hash: 2] | [Label: C, Hash: 2] |
| 3 | [Label: D, Hash: 2] | [Label: D, Hash: 3] |
| 4 | [Label: E, Hash: 2] | |
| 5 | [Label: F, Hash: 2] | |
| 6 | [Label: G, Hash: 2] | |

In this example, each local list item references a local object via a label and includes a hash (the local hash) of that object. Similarly, each primary cluster list item references a primary cluster object via a label and includes a primary hash (the server hash) of that object. The following illustrates the processing of such a pair of local and primary cluster lists according to process 800.

The local and server markers are initially set to reference the first item in the respective lists. At 806, the mirror node 132 determines that the label of both the local list item and primary cluster list item is the same (i.e. 'A'). At 808 the mirror node 132 determines that the content of both items (i.e. hash value) are also the same (i.e. '1'). Accordingly, at 812 the mirror node 132 updates both the server and local list markers to point to the next items in the server and local lists respectively (item 2 in both lists).

In the next iteration of the process, both markers point to item 2. At 806 the item labels are different ('B' in the local list and 'C' in the primary cluster list). At 814, the primary cluster list item label (that is, 'C') is more recent than the local list item label 'B'. Therefore, the object referenced by the local list item with label 'B' has been deleted at the primary cluster 110 and is (at 815) deleted from the mirror node 132. At 816, the local list marker is updated to reference the next item in the local list—item 3.

At the next iteration, the local list marker points to item 3 and the primary cluster list maker points to item 2. At 814 the mirror node 132 determines that the label of the local list item ('D') is more recent that the label of the primary cluster list item ('C') and therefore adds the object corresponding to the primary cluster list item (at 817). Following this, the primary cluster list marker is updated (at 818) to reference the next item in the primary cluster list—item 3.

At the next iteration, both markers are at item 3. At 806 the labels are determined to be the same ('D'), but at 808 the content (hash values) are different. Accordingly, at 810 mirror node 132 performs an update operation in respect of the object with label 'D' (retrieving data from the primary cluster 110 if required). At 812, the mirror node 132 then updates both the server and local list markers to point to the next items in the server and local lists respectively (item 4 in both lists).

At 802 no unprocessed items are left in the primary cluster list, and at 820 unprocessed items do remain in the local list (items 4, 5, and 6 with labels 'E, 'F' and 'G' respectively). Accordingly, at 822 mirror node 132 deletes the objects referenced by these items.

By way of further illustration, the following is another example of a local and primary cluster list for a GIT type repository:

| Primary cluster list |
| --- |
| A refs/heads/1 |
| B refs/heads/2 |
| d refs/heads/4 |
| C refs/heads/7 |
| D refs/heads/8 |
| E refs/heads/11 |
| F refs/heads/12 |
| G refs/heads/master |
| Z refs/heads/zzzzzz |
| e refs/tags/X |
| f refs/tags/Y |

| Local list |
| --- |
| a refs/heads/1 |
| c refs/heads/3 |
| d refs/heads/4 |
| e refs/heads/6 |
| f refs/heads/9 |
| g refs/heads/master |
| y refs/tags/Y |
| g refs/tags/Z |

In this example the first value of each item represents the hash value and the following string represents the label. E.g. in item "A refs/heads/1": the hash is 'A' and the label is "refs/heads/1".

Processing these two lists produces the following sequence of operations to bring a mirror node 132 into line with the primary cluster 110.

```
[snaps: refs/heads/1 @ A]
[local: refs/heads/1 @ a]
   UPDATE: refs/heads/1 -> A
[snaps: refs/heads/2 @ B]
[local: refs/heads/3 @ c]
   ADD: refs/heads/2 -> B
[snaps: refs/heads/4 @ d]
[local: refs/heads/3 @ c]
   DELETE: refs/heads/3
[snaps: refs/heads/4 @ d]
[local: refs/heads/4 @ d]
   NOTHING TO DO
[snaps: refs/heads/7 @ C]
[local: refs/heads/6 @ e]
   DELETE: refs/heads/6
[snaps: refs/heads/7 @ C]
[local: refs/heads/9 @ f]
   ADD: refs/heads/7 -> C
[snaps: refs/heads/8 @ D]
[local: refs/heads/9 @ f]
   ADD: refs/heads/8 -> D
[snaps: refs/heads/11 @ E]
[local: refs/heads/9 @ f]
   ADD: refs/heads/11 -> E
[snaps: refs/heads/12 @ F]
[local: refs/heads/9 @ f]
   ADD: refs/heads/12 -> F
[snaps: refs/heads/master @ G]
[local: refs/heads/9 @ f]
   DELETE: refs/heads/9
[snaps: refs/heads/master @ G]
[local: refs/heads/master @ g]
   UPDATE: refs/heads/master -> G
[snaps: refs/heads/zzzzzz @ Z]
[local: refs/tags/Y @ y]
   ADD: refs/heads/zzzzzz -> Z
[snaps: refs/tags/X @ e]
[local: refs/tags/Y @ y]
   ADD: refs/tags/X -> e
[snaps: refs/tags/Y @ f]
[local: refs/tags/Y @ y]
   UPDATE: refs/tags/Y -> f
[snaps: refs/tags/Y @ f]
[local: refs/tags/Z @ g]
   DELETE: refs/tags/Z
```

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using flowcharts. These flowcharts may be implemented as computer implemented methods by providing computer readable instructions which, when executed by a processor, cause the processor to perform the various operations described in the flowcharts. Although the flowcharts define operations in particular orders to explain various features, in some cases the steps may be able to be performed in a different order. Furthermore, in some cases one or more steps may be combined into a single step, a single step may be divided into multiple separate steps, and/or the function(s) achieved by one or more of the described/ illustrated steps may be achieved by one or more alternative steps. Still further, the functionality/processing of a given flowchart step could potentially be performed by various different systems or applications.

It will be understood that the invention disclosed and defined in this specification extends to all alternative combinations of two or more of the individual features mentioned or evident from the text or drawings. All of these different combinations constitute various alternative aspects of the invention.

What is claimed is:

1. A computer implemented method comprising:
   receiving, by a first mirror node, a primary cluster list, the primary cluster list including references to one or more primary cluster objects maintained by a primary cluster;
   generating, by the first mirror node, a local list, the local list including references to one or more local objects maintained by the first mirror node in a data store accessible to the first mirror node;
   determining, by the first mirror node and based on the primary cluster list and the local list, one or more operations to be performed by the first mirror node to align the one or more local objects maintained by the first mirror node with the one or more primary cluster objects maintained by the primary cluster;
   performing, by the first mirror node, the one or more operations to align the one or more local objects maintained by the first mirror node with the one or more primary cluster objects maintained by the primary cluster; and
   sending, by the first mirror node, the primary cluster list to one or more second mirror nodes.

2. A computer implemented method according to claim 1, further comprising:
   receiving, by the first mirror node, one or more update complete notifications, each update complete notification being received from a particular second mirror node and indicating that the particular second mirror node has performed operations to align local objects maintained by the particular second mirror node with the one or more primary cluster objects maintained by the primary cluster.

3. A computer implemented method according to claim 2, further comprising:
   determining, by the first mirror node, that update complete notifications have been received from all active second mirror nodes; and
   in response to determining that update complete notifications have been received from all active second mirror nodes, updating, by the first mirror node, a first mirror node view, wherein subsequent to updating the first mirror node view the first mirror node serves content based on the one or more local objects as updated by performing the one or more operations.

4. A computer implemented method according to claim 3, wherein in response to determining that update complete notifications have been received from all active second mirror nodes the method further comprises communicating an update view notification to each active second mirror node.

5. A computer implemented method according to claim 2, further comprising:
   determining that a given second mirror node is non-responsive; and
   in response to determining that the given second mirror node is non-responsive, causing the given second mirror node to be deactivated.

6. A computer implemented method according to claim 5, wherein determining that the given second mirror node is non-responsive comprises determining that a timeout period has elapsed without receiving an update complete notification from the given second mirror node.

7. A computer implemented method according to claim 1, wherein determining one or more operations to be performed by the first mirror node comprises:
   determining that a particular primary cluster object referenced in the primary cluster list does not have a corresponding local object referenced in the local list; and
   in response to determining that the particular primary cluster object referenced in the primary cluster list does not have a corresponding local object referenced in the local list, determining that an add operation is to be performed to add the particular primary cluster object to the data store accessible to the first mirror node as a local object.

8. A computer implemented method according to claim 1, wherein determining one or more operations to be performed by the first mirror node comprises:
   determining that a particular local object referenced in the local list does not have a corresponding primary cluster object referenced in the primary cluster list; and
   in response to determining that the particular local object referenced in the local list does not have a corresponding primary cluster object referenced in the primary cluster list, determining that a delete operation is to be performed to delete the particular local object from the data store accessible to the first mirror node.

9. A computer implemented method according to claim 1, wherein determining one or more operations to be performed by the first mirror node comprises:
   determining that a particular local object referenced in the local list has a corresponding primary cluster object referenced in the primary cluster list; and
   in response to determining that the particular local object referenced in the local list has a corresponding primary cluster object referenced in the primary cluster list, determining if the particular local object referenced in the local list is the same as the corresponding primary cluster object referenced in the primary cluster list; and
   in response to determining that the particular local object referenced in the local list is not the same as the corresponding primary cluster object referenced in the primary cluster list, determining that an update operation is to be performed to align the particular local object referenced in the local list with the corresponding primary cluster object referenced in the primary cluster list.

10. A computer implemented method according to claim 9, wherein determining if the particular local object referenced in the local list is the same as the corresponding primary cluster object referenced in the primary cluster list comprises comparing a local list hash associated with the particular local object referenced in the local list with a primary cluster hash associated with the corresponding primary cluster object referenced in the primary cluster list.

11. A computer processing system configured to operate as a first mirror node in a mirror farm, the computer processing system comprising:
    a processor;
    a communication interface; and memory storing sequences of instructions, which when executed by the processor, cause the processor to:
receive, via the communication interface, a primary cluster list, the primary cluster list including references to one or more primary cluster objects maintained by a primary cluster;
generate a local list, the local list including references to one or more local objects maintained in a data store accessible to the computer processing system;
determine, based on the primary cluster list and the local list, one or more operations to be performed to align the one or more local objects with the one or more primary cluster objects;
perform the one or more operations to align the one or more local objects maintained in the data store accessible to the computer processing system with the one or more primary cluster objects maintained by the primary cluster; and
send the primary cluster list to one or more second mirror nodes.

12. A computer processing system according to claim 11, wherein execution of the sequences of instructions further causes the processor to:
receive one or more update complete notifications, each update complete notification being received from a particular second mirror node and indicating that the particular second mirror node has performed operations to align local objects maintained by the particular second mirror node with the one or more primary cluster objects maintained by the primary cluster.

13. A computer processing system according to claim 12, wherein execution of the sequences of instructions further causes the processor to:
determine that update complete notifications have been received from all active second mirror nodes; and
in response to determining that update complete notifications have been received from all active second mirror nodes, update a first mirror node view, wherein subsequent to updating the first mirror node view the computer processing system serves content based on the one or more local objects as updated by performing the one or more operations.

14. A computer processing system according to claim 13, wherein in response to determining that update complete notifications have been received from all active second mirror nodes, execution of the sequences of instructions further cause the processor to communicate an update view notification to each active second mirror node.

15. A computer processing system according to claim 12, wherein execution of the sequences of instructions further cause the processor to:
determine that a given second mirror node is non-responsive; and
in response to determining that the given second mirror node is non-responsive, cause
the given second mirror node to be deactivated.

16. A computer processing system according to claim 15, wherein determining that the given second mirror node is non-responsive comprises determining that a timeout period has elapsed without receiving an update complete notification from the given second mirror node.

17. A computer processing system according to claim 11, wherein determining one or more operations to be performed comprises:
determining that a particular primary cluster object referenced in the primary cluster list does not have a corresponding local object referenced in the local list; and
in response to determining that the particular primary cluster object referenced in the primary cluster list does not have a corresponding local object referenced in the local list, determining that an add operation is to be performed to add the particular primary cluster object to the data store accessible to the computer processing system as a local object.

18. A computer processing system according to claim 11, wherein determining one or more operations to be performed comprises:
determining that a particular local object referenced in the local list does not have a corresponding primary cluster object referenced in the primary cluster list; and
in response to determining that the particular local object referenced in the local list does not have a corresponding primary cluster object referenced in the primary cluster list, determining that a delete operation is to be performed to delete the particular local object from the data store accessible to the first mirror node.

19. A computer processing system according to claim 11, wherein determining one or more operations to be performed comprises:
determining that a particular local object referenced in the local list has a corresponding primary cluster object referenced in the primary cluster list; and
in response to determining that the particular local object referenced in the local list has a corresponding primary cluster object referenced in the primary cluster list, determining if the particular local object referenced in the local list is the same as the corresponding primary cluster object referenced in the primary cluster list; and
in response to determining that the particular local object referenced in the local list is not the same as the corresponding primary cluster object referenced in the primary cluster list, determining that an update operation is to be performed to align the particular local object referenced in the local list with the corresponding primary cluster object referenced in the primary cluster list.

20. A computer processing system according to claim 19, wherein determining if the particular local object referenced in the local list is the same as the corresponding primary cluster object referenced in the primary cluster list comprises comparing a local list hash associated with the particular local object referenced in the local list with a primary cluster hash associated with the corresponding primary cluster object referenced in the primary cluster list.

* * * * *